United States Patent [19]

Glennon

[11] Patent Number: 4,663,581
[45] Date of Patent: May 5, 1987

[54] VOLTAGE REGULATED PERMANENT MAGNET GENERATOR SYSTEM

[75] Inventor: Timothy F. Glennon, Rockford, Ill.

[73] Assignee: Sundstrand Corporation, Rockford, Ill.

[21] Appl. No.: 667,157

[22] Filed: Oct. 31, 1984

[51] Int. Cl.$^4$ .................. H02P 9/40; H02K 16/00
[52] U.S. Cl. .................. 322/52; 310/114; 322/28
[58] Field of Search .......... 322/28, 29, 25, 27, 322/32, 52, 54, 55, 44; 310/113–116, 156; 318/652, 620

[56] References Cited

U.S. PATENT DOCUMENTS

| | | | |
|---|---|---|---|
| 2,500,730 | 3/1950 | Yonkers | 322/52 X |
| 2,784,332 | 3/1957 | Kober | 322/52 X |
| 3,459,980 | 8/1969 | Coroller | 310/114 |
| 3,713,015 | 1/1973 | Frister | 310/114 X |
| 4,051,423 | 9/1977 | Touchton et al. | 318/620 X |
| 4,305,031 | 12/1981 | Wharton | 322/29 |
| 4,371,801 | 2/1983 | Richter | 310/156 |

Primary Examiner—R. J. Hickey
Attorney, Agent, or Firm—Wood, Dalton, Phillips, Mason & Rowe

[57] ABSTRACT

A permanent magnet generating system includes first and second permanent magnet generators, or PMG's each having a permanent magnet rotor structure and a stator structure. Each stator structure has at least one stator winding disposed therein and the stator windings of the PMG's are connected in series so that the voltages developed thereby add vectorially to develop a combined output voltage. The position of the stator windings of one PMG is adjustable relative to the position of the stator windings of the other PMG to vary the phase angle between the two output voltages of the PMG's so that the combined output voltage can be controlled at a desired value irrespective of changes in operating speed or load.

13 Claims, 10 Drawing Figures

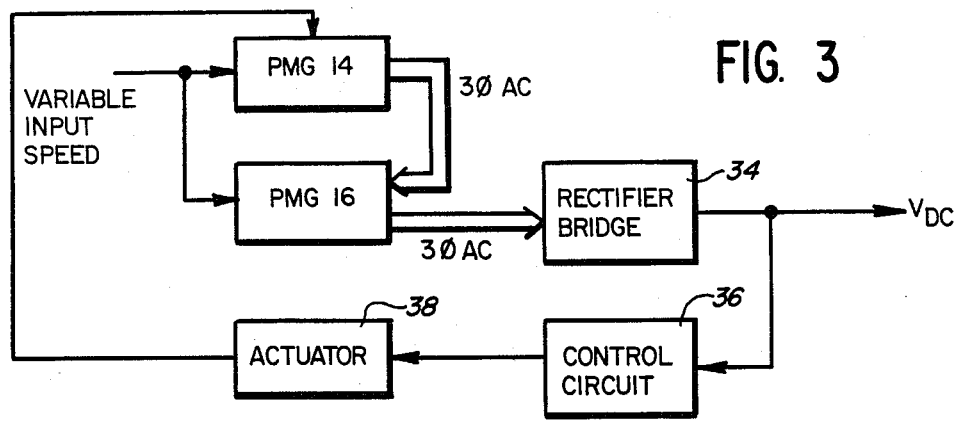
FIG. 3
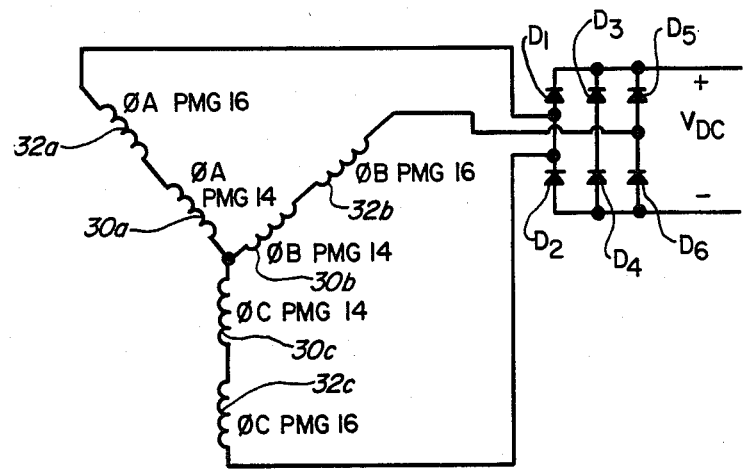
FIG. 4
FIG. 5
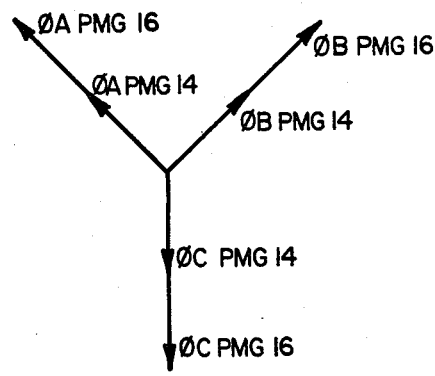
FIG. 6
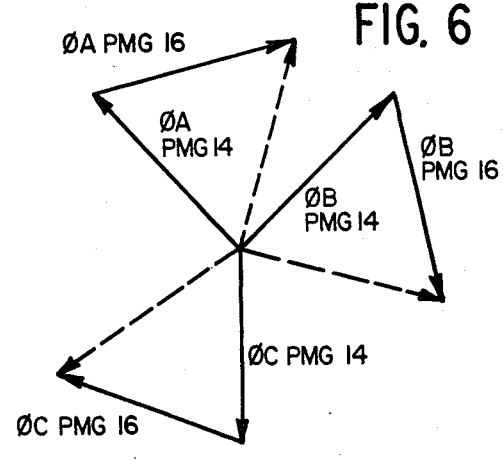

4,663,581

VOLTAGE REGULATED PERMANENT MAGNET GENERATOR SYSTEM

DESCRIPTION

1. Technical Field

The present invention relates generally to dynamoelectric machines, and more particularly to a permanent magnet generating system for developing a controlled voltage.

2. Background Art

Permanent magnet generators, or PMG's, have been found to be a simple and inexpensive means of generating electrical power from a source of motive power since PMG's do not require a separate source of electrical power for field excitation. Hence, electrical power can be generated by a machine of small size and weight.

However, it has been found that the output voltage of a PMG is a function of the relative speed between the rotor and stator structures and also of the current drawn by a load. These limitations have prevented the use of PMG's as a main power source in installations requiring a stable voltage source, such as in an aircraft. Consequently, power generation systems in these applications have utilized wound field machines having exciters and rotating rectifiers which must be driven at a high speed in order to reduce the size and weight of the system to an acceptable level. At these high speeds, complex cooling apparatus must be provided to dissipate heat developed in the windings and in the rotating rectifiers.

On the other hand, a PMG does not require complex cooling apparatus since it develops little or no heat in operation.

Hence, it would be desirable to provide a means of regulating the output voltage of a PMG so that it can be used with a varibale speed prime mover and/or can be subjected to varying loads.

One prior system for regulating the output voltage of a PMG is the conventional phase-controlled rectifier bridge wherein controlled rectifiers are fired at appropriate points in the output power waveform to develop DC output power. This prior type of voltage control is relatively complex since substantial controls are required to accurately fire the controlled rectifiers in the bridge. Furthermore, a relatively large filter including inductors and capacitors must be connected to the output of the controlled rectifier bridge to provide smoothing. The filter must also have means for dissipating the heat developed in the filter components.

Other systems having means for regulating the output voltage of a PMG are disclosed in Frister U.S. Pat. Nos. 3,713,015 and Wharton 4,305,031. Each of these patents discloses a permanent magnet generator having two radial flux magnetic structures disposed on a rotor for producing first and second magnetic fields. One of the magnetic structures is movable relative to the other by means of an actuator. A set of stator windings is disposed in the first and second fields and develops output voltage as the magnetic fields rotate relative thereto. The total magnetic field set up by the frist and second magnetic structures is the vector sum of the two fields, and hence the output voltage magnitude may be controlled by varying the placement of one field relative to another.

The Frister and Wharton systems require the actuator to be disposed on the rotor. This, in turn, necessitates that the actuator to be rather complex, resulting in a large and expensive system.

Another type of system having voltage regulation capability is disclosed in Richter U.S. Pat. No. 4,371,801. This patent discloses a polyphase axial flux permanent magnet generator having a pluraltiy of stator winding disks disposed in a plurality of air gaps intermediate rotor magnetic structures. Stator windings are disposed on the winding disks and the respective phases of the windings are connected to one another in series so that the voltages developed thereby add vectorially. Alternate ones of the stator winding disks are movable relative to the remaining stator disks to vary the output voltage of the generator.

The stator disks of the Richter device are disposed within in a housing. Many bearings are needed to permit movement of the movable disks relative to the housing to prevent seizing of the relatively movable parts caused by the inevitable vibration of the device.

Furthermore, the Richter device requires a complex interconnection scheme for the stator windings since many windings must be connected together for each phase.

Additionally, the Richter device has a high air gap volume and hence is not a high power density machine. This is disadvantageous in applications requiring high power output for a given electromagnetic weight.

DISCLOSURE OF THE INVENTION

In accordance with the present invention, output voltage regulation of a permanent magnet generating system is accomplished by combining the outputs of two or more radial flux permanent magnet generators and by adjusting the output of one generator relative to the other(s) to control the resulting combined output.

Each PMG includes a rotor magnetic structure, a set of single or polyphase windings disposed in a stator and means for coupling the rotor structure to a source of motive power. The stator windings of a first PMG are movable with respect to the windings of a second PMG. The respective phases of the stator windings of the first and second PMG's are connected in series so that the output voltages developed thereby are vectorially added together to produce an overall or combined output voltage.

The PMG system also includes an actuator for adjusting the position of the stator windings of the first PMG relative to the stator windings of the second PMG. In a first embodiment of a power supply utilizing the PMG system, the alternating current output power of the system is rectified to produce DC power. The actuator is responsive to the difference between the rectified DC output voltage and a desired voltage. When the DC output voltage attempts to vary from the desired voltage, the stator windings of the first PMG are adjusted by the actuator relative to the position of the windings of the second PMG to vary the phase of the output voltage of one PMG relative to the other to in turn control the magnitude of the overall output voltage.

In a second embodiment of a power supply utilizing the PMG system, a constant speed drive is interposed between the prime mover and the PMG's so that constant frequency AC power is developed thereby. In this case, the actuator is responsive to the overall output voltage and the output current so that the output voltage is maintained until a specified output current condition is reached.

The permanent magnet generating system of the present invention is simpler than prior systems since only relatively few bearings need be utilized to accommodate the movement of one stator relative to one another. Moreover, connections between the stator windings are more easily accomplished since only two sets of windings are connected together. Furthermore, since stator structures are moved relative to one another and not rotor structures, there is no need for an actuator which is disposed on the rotor or which traverses the stationaryrotating interface. Accordingly, system complexity is reduced.

Also, the system disclosed herein utilizes radial flux permanent magnet generators which are inherently high power density machines, and hence the system can be designed for small size and weight for a given output power rating. Since the system does not require substantial cooling, the PMG's can be driven at high speeds without signficantly increasing the complexity of the overall system.

BRIEF DESCRIPTION OF THE DRAWINGS

FIG. 3 is a block diagram of a first embodiment of a power supply which utilizes the PMG system shown in FIG. 2;

FIG. 4 is a schematic diagram illustrating the connection of the two PMG's to the bridge shown in FIG. 3;

FIGS. 5 and 6 are phasor diagrams illustrating the operation of the PMG system of the first embodiment at first and second speeds, respectively, where the second speed is twice the first;

BEST MODE FOR CARRYING OUT THE INVENTION

Figure 1:
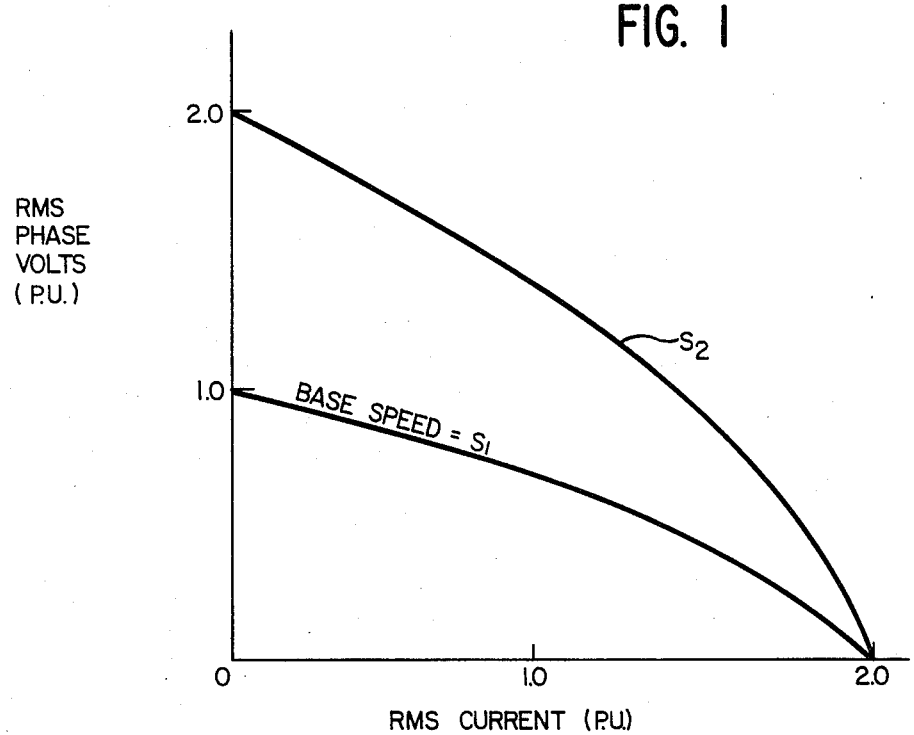
FIG. 1 is a graph of the voltage/current characteristics for a typical permanent magnet generator operating at first and second speeds, where the second speed is twice that of the first.

Referring now to the graph of FIG. 1, there is illustrated the voltage/current characteristic for a typical permanent magnet generator, or PMG, operating at two different speeds $S_1$ and $S_2$. As shown by the graph illustrating PMG operation at speed $S_1$, the voltage per phase drops from one per unit to zero as current increases from zero load up to twice rated load.

At an operational speed $S_2$ twice the speed $S_1$, the voltage increases to twice rated voltage at zero load and decreases to zero volts at twice rated current.

As shown by the graph of FIG. 1, it can be seen that PMG output voltage varies as a function of operating speed and as a fucntion of load. If the permanent magnet generator output is to be rectified to provide a stable DC output, a controlled rectifier bridge must be connected to the output of the PMG to phase control the PMG output. However, the use of the controlled rectifier bridge introduces substantial harmonics into the DC output which must be filtered by large and expensive filter components, Furthermore, firing and commutation circuitry must be provided for the controlled rectiers in the bridge, increasing even more the cost and complexity of the overall system.

Figure 2:
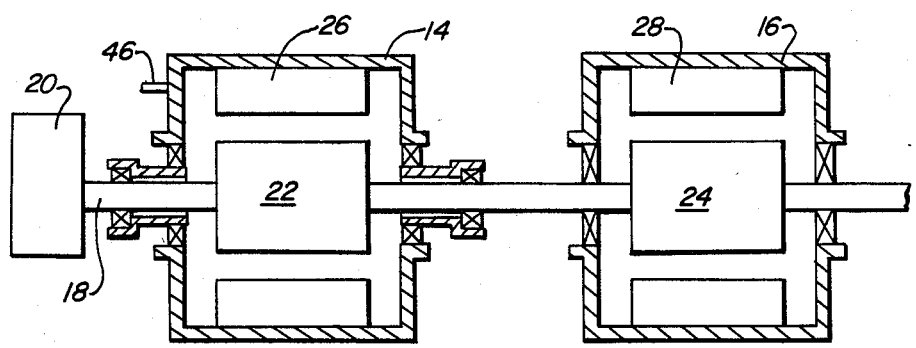
FIG. 2 is an elevational view, partly in section, illustrating the permanent magnet generator system of the present invention.

Referring now to FIG. 2, there is shown a permanent magnet generating system according to the present invention. The system includes first and second permanent magnet generators or PMG's 14,16 coupled by means of a shaft 18 to a source of motive power such as prime mover 20. Each PMG 14,16 includes a permanent magnet structure comprising rotors 22,24, respectively. Each PMG 14,16 also includes a stator structure 26,28 which contains a set of armature windings 30,32, respectively.

The stator 26 of the PMG 14 is movable relative to the stator 28 of the PMG 16 to adjust the phase of the output voltage from the windings 30 relative to the phase of the output voltage from the windings 32, as noted more specifically below.

Referring also to FIG. 3, which illustrates a first embodiment of a power supply utilizing the PMG system of FIG. 2, the armature windings 30,32 of the PMG's 14,16 are connected in series with a rectifier 34 which may comprise a plurality of diodes D1–D6 connected in a bridge configuration. The output of the rectifier 34 may be supplied to a DC load, or may be provided to an inverter for developing constant frequency output power from the input power provided by the varible speed shaft.

The output of the rectifier bridge 34 is connected through a control circuit 36 and an actuator 38 which in turn adjusts the rotational placement of the stator 26 of the PMG 14.

As seen in FIG. 4, in the case of three-phase PMG's 14,16, each phase winding 32a–32c of the PMG 16 is connected between the respective phase winding 30a–30c of the PMG 14 and a leg of the rectifier bridge 34. The respective phases of the PMG output voltages are combined to develop a combined or overall voltage comprising the vector sum of the individual PMG output voltages due to the series connection of phase windings. As previously noted, the combined output voltage is rectified by the bridge 34 to produce DC power.

In the PMG system illustrated in the figures, the stator windings of the PMG 14 are movable relative to the stator windings of the PMG 16. This requires that a total of three connections between the stator windings must be capable of flexing to accommodate this relative movement. It should be noted that the stator windings of the PMG 16 could be movable while the stator windings of the PMG 14 are stationary, in which case a total of six PMG winding leads must be capable of flexing.

The phasor diagram of FIG. 5 illustrates the operation of the PMG system at a particular speed $S_1$. The speed $S_1$ is the lowest speed at which the system will produce a desired output. At this point, each PMG supplies one-half of the desired output voltage. It should be noted that the PMG's can be sized to produce different proportions of the overall output voltage, as desired. For example, one of the PMG's 14,16 may be utilized as a main power source, while the other machine may be utilized only to provide additional output power under a fault condition such as a short circuit.

At the speed $S_1$, the actuator 38 positions the stator of the PMG 14 so that the voltages induced in the windings 30,32 are in phase and equal to produce the resultant output voltages shown in FIG. 5.

The phasor diagram of FIG. 6 illustrates the operation of the PMG system at an operational speed $S_2$ which is twice $S_1$. At speed $S_2$, each phase voltage appearing across each winding 30,32 is twice as great as the voltage at speed $S_1$. In order to maintain the combined voltage delivered to the bridge 34 at the desired level, the position of the stator 26 of the PMG 14 is adjusted relative to the position of the stator 28 so that each phase voltage of the PMG 16 is phase displaced from the respective phase voltage of the PMG 14. Since the phase voltages from each set of windings are vectorially added, the magnitude of the overall voltage is unchanged over the output at speed $S_1$.

Figure 7:
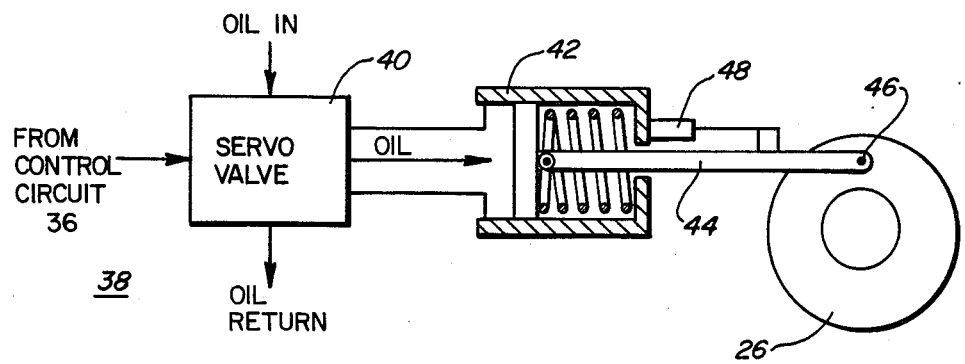
FIG. 7 is a schematic diagram of an actuator for rotating the stator of one of the PMG's shown in FIG. 2 in response to the output voltage of the rectifier shown in FIG. 3.

Referring now to FIG. 7, the actuator 38 includes a servo valve 40 which controls the delivery of hydraulic fluid to a control piston 42 in accordance with the magnitude of a control signal from the control circuit 36. The control piston 42 includes an actuator rod 44 which is in turn connected to a pivot 46 disposed on the stator 26 of the PMG 14. A position sensing device 48 is connected to and senses the position of the actuator rod 44 and provides a position feedback signal to the control circuit 36. In the preferred embodiment, the position sensing device 48 comprises a linear variable differential transducer, or LVDT. Alternatively, the device 48 may comprise a linear potentiometer, if desired, or a roatary variable differential transducer, or RVDT, disposed on the stator 26 of the PMG 14.

Figure 8:
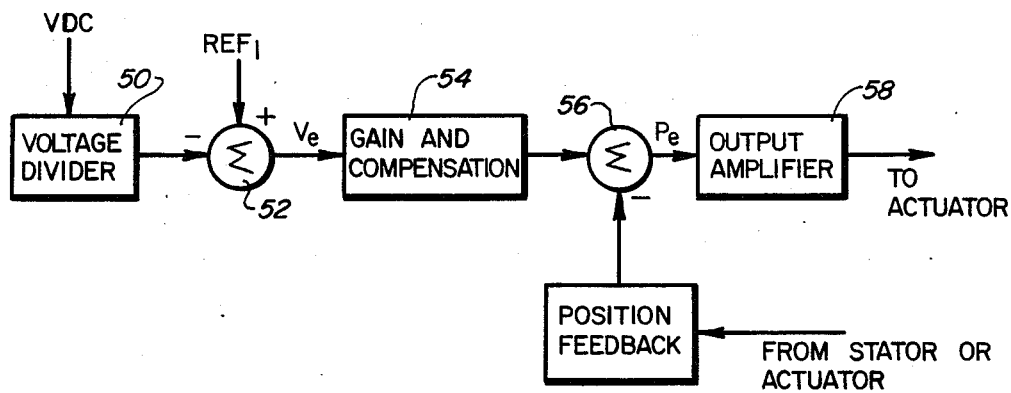
FIG. 8 is a block diagram of control circuitry for operating the actuator shown in FIG. 7.

Referring now to FIG. 8, the control circuit senses the position of the actuator rod (alternatively the position of the stator 26 itself if the RVDT is utilized) and the output voltage of the bridge 34 and adjusts the position of the stator 26 accordingly. The control circuit could sense other parameters of the system and control stator placement as a result of such sensing, if desired.

A voltage divider 50 shifts the voltage at the output of the bridge 34 to an appropriate level and applies this voltage to one input of a summing junction 52. This voltage is compared in the junction 52 with a reference REF, to drive an error voltage which is coupled through a gain and compensation circuit 54 to a second summing junction 56. The gain and compensation circuit 54 provides suitable dynamic response and may include an integrator to maintain the error voltage near zero, if desired.

The signal from the gain and compensation circuit 54 is compared with the position feedback signal from the position sensing device 48 in the summing junction 56. The resulting position error signal, denoted $P_e$, is applied through an output amplifier 58 to the servo valve 40 shown in FIG. 7.

The control circuit causes the control piston to position the actuator rod 44 and hence the stator 26 relative to the stator 28 to maintain the output magnitude of the overall output voltage at the desired level.

It should be noted that the actuator can alternatively be of a different form, such as a pneumatic or electric type of positioning apparatus, if desired. Also, a set of planetary gears with a movable leg could be utilized to displace the stators of the PMG's 14,16 in equal and opposite directions. Or, an idler gear may be utilized to transfer power from a motor to a pivot mounted on one stator to move the stator as needed.

Furthermore, it should also be noted that more than two permanent magnet generators can be connected together as illustrated herein and the position of one or more stators can be adjusted relative to the position of the remaining stators to provide output voltage regulation.

The PMG system of the present invention is also operative to maintain output voltage regulation with changes in load, such operation being automatically accomplished by the control apparatus previously described.

The two permanent magnet generators 14,16 can be combined into one permanent magnet generator having separate stator structures, each of which includes one or more stator windings, with the stator sections being movable relative to one another as previously noted. Also, it should be mentioned that permanent magnet structures may be disposed in the stator of a PMG, with the armature windings disposed on the rotor and with the permanent magnet structures in the stator being relatively movable.

Figure 9:
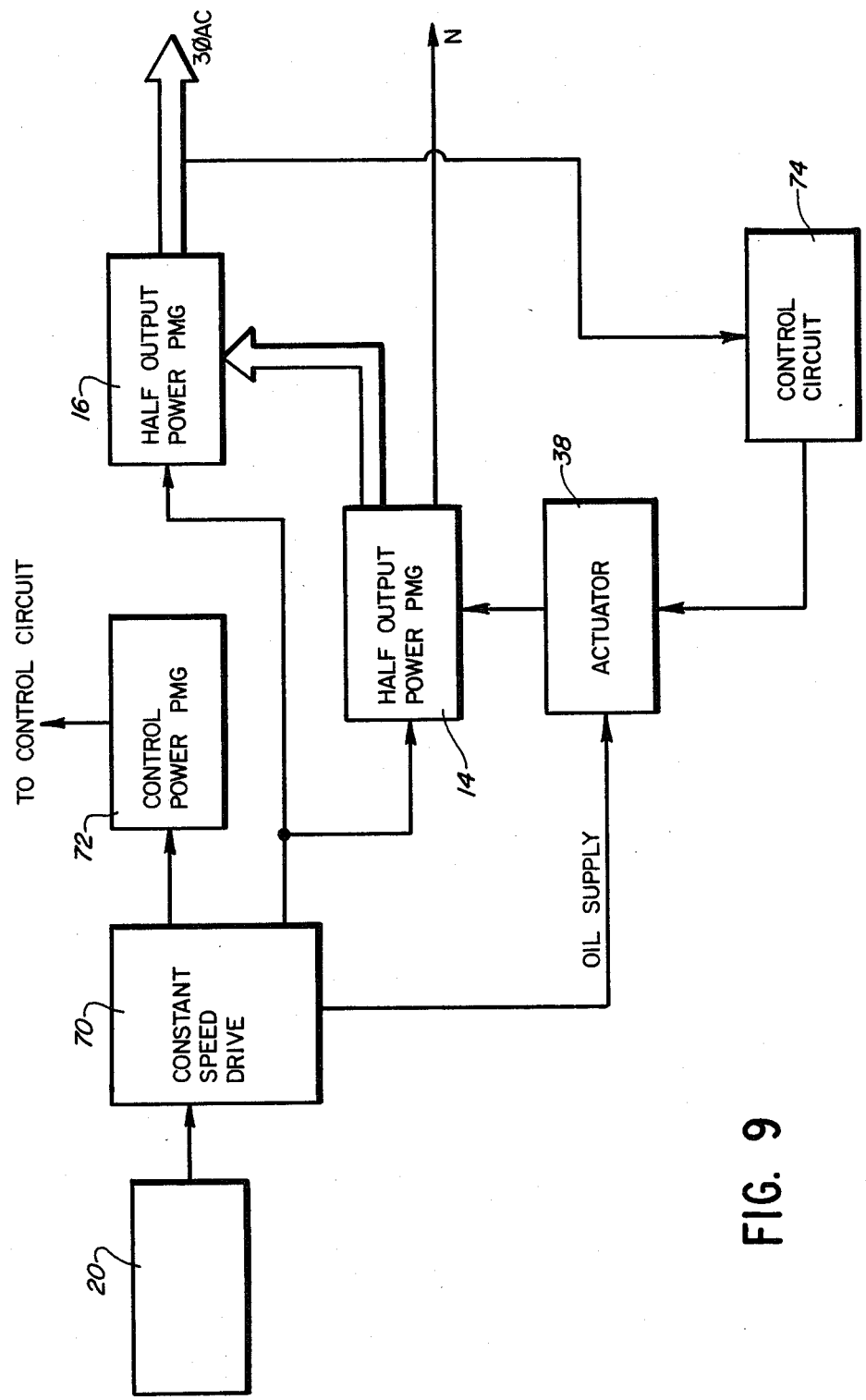
FIG. 9 is a block diagram of a second embodiment of a power supply which utilizes the PMG system shown in FIG. 2 with the exception that a constant speed drive is interposed between the prime mover and the PMG's.
Figure 10:
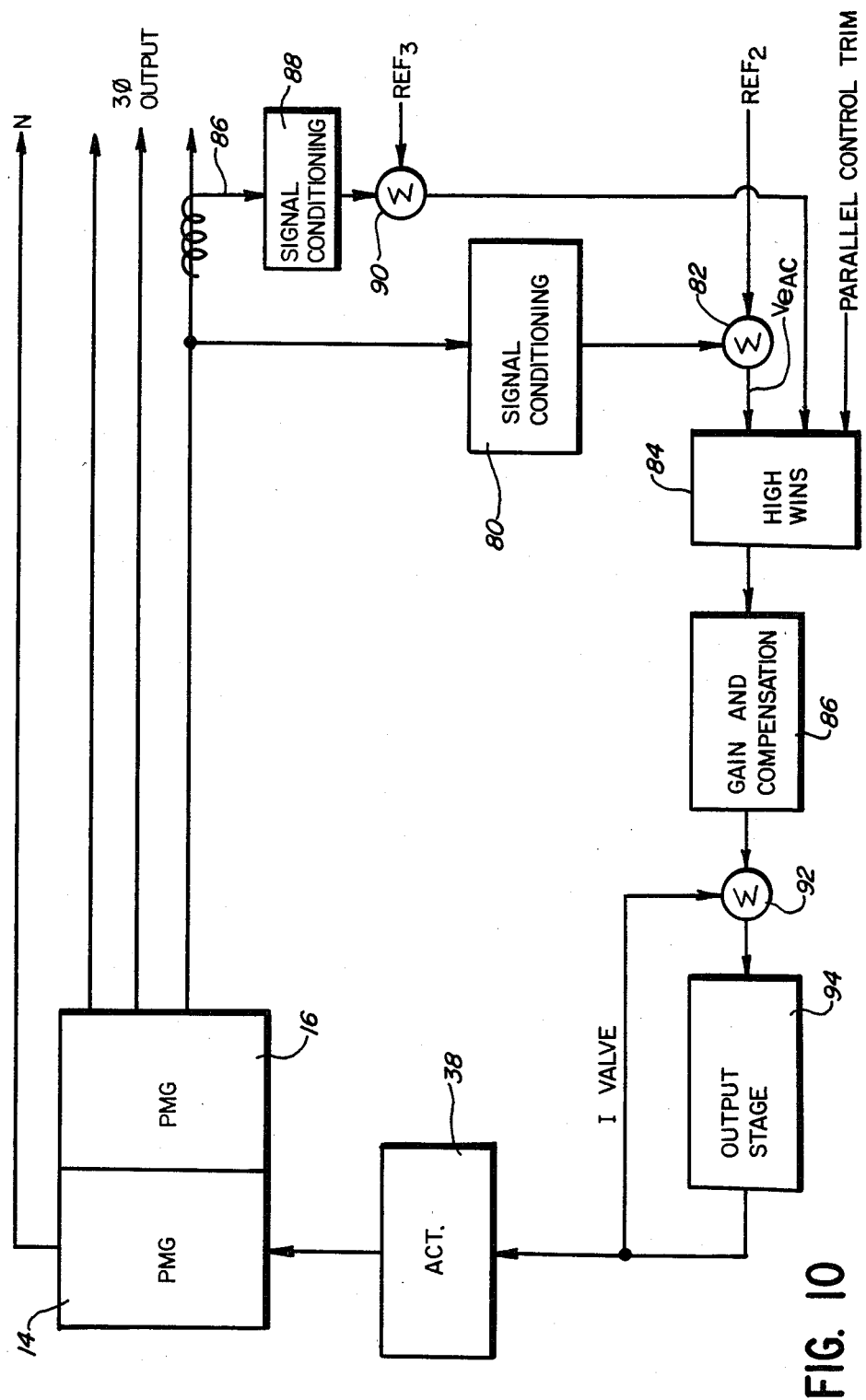
FIG. 10 is a block diagram of the system shown in FIG. 9 which discloses in greater detail the system control circuit illustrated therein.

Referring now to FIGS. 9 and 10, there is illustrated a second embodiment of a power supply incorporating the PMG system shown in FIG. 2. Structures common to FIGS. 9 and 10 and the previous figures are assigned like reference numerals. Referring specifically to FIG. 9, the PMG's are driven at a constant speed by a constant speed drive 70 which is interposed between the prime mover 20 and the PMG's 14,16. The constant speed drive also drives a small signal level control power PMG 72 which provides power for a control circuit 74 which controls the actuator 38. The control PMG 27 is also utilized to supply current in the event of a fault condition.

The control circuit may be part of a generator control unit, or GCU, which allows multiple power supply systems to be paralleled and which controls overall aircraft power.

The constant speed drive 70 is hydraulic unit which has its own hydraulic fluid supply and which provides such fluid under pressure to the actuator 38 as needed. In this embodiment, therefore, a separate source of hydraulic fluid is not required for the actuator.

As opposed to the first embodiment, the combined output from the PMG's 14,16 is not rectified but is provided as constant frequency polyphase alternating current power. This power is developed at the output of the PMG 16 while a neutral is provided from the PMG 14. This power supply is particularly adaptable for use in applications requiring a stable source of constant frequency AC power of a specified level. Moreover, the system is well suited to be driven at a high speed so that the system can be of minimum size and weight. An ideal application for this embodiment of a power supply system is in an aircraft.

Referring now to FIG. 10, one phase of the output voltage from the PMG's 14,16 is coupled to a signal conditioning circuit 80 which shifts the voltage to an appropriate level and couples this voltage to a summing junction 82. The summing junction 82 compares the shifted voltage with a reference $REF_2$ to develop an error signal $V_{EAC}$. This error signal is coupled to one input of a high wins circuit 84.

The other input to the high wins circuit 84 is a current error signal which is developed by sensing the current in one phase of the output from the PMG's 14,16 by means of a current transformer 86, shifting the level of the output from the transformer 86 in a conditioning circuit 88 and comparing this signal with a reference REF$_3$ in a summing junction 90.

The high wins circuit 84 allows the higher valued of the two error signals to pass to a gain and compensation circuit 86. In the absence of an overcurrent condition at the output of the PMG's 14,16, the signal $V_{EAC}$ is coupled to the gain and compensation circuit 86 and from thence to a summing junction 92. The output from the summing junction 92 is coupled to an output stage 94 which in turn drives the actuator 38. Current feedback is provided by coupling the output of the output stage 94 back to the summing junction 92 in a negative sense.

In the event of an overcurrent condition, the output from the summing junction 90 is coupled through the high wins circuit 84 to the gain and compensation circuit 86 so that the positioning of the stator of the PMG 14 is accomplished in accordance with the output current as sensed by the transformer 86.

This power supply can take the place of prior wound field generating systems which have typically been used in aircraft applications requiring minimum size and weight. In this case, cooling requirements are lessened since the only source of heat during operation is the sleeve encapsulating the rotor magnetics caused by induced eddy currents therein. This source of heat can be eliminated by the utilization of fiber or carbon composite retaining rings surrounding the magnetics which do not develop eddy currents. In this case, cooling apparatus can be entirely eliminated, thereby resulting in a further savings in size and weight of the generating system.

Furthermore, as compared with prior PMG devices which utilize a converter at the output of the PMG to maintain a stable voltage source, the maximum voltage excursion in the case of a fault in the system is limited since the PMG's are driven by a constant speed drive, thereby eliminating voltage excursions due to overspeed operation.

Furthermore, the control loop does not have to handle high power levels, such as from an exciter, but need only handle the servo valve current. Hence, the control loop is simplified and is more efficient.

I claim:

1. A permanent magnet generating system driven by a source of motive power, comprising:
   separate first and second permanent magnet generators (PMG's) each having a rotating permanent magnet structure connected to the source of motive power and a stator having a stator winding therein with the stator windings being connected in series and developing a combined output, the stator of the first PMG being movable relative to the stator of the second PMG;
   an actuator for moving the stator of the first PMG; and
   a control circuit responsive to the combined output for controlling the actuator to move the stator of the first PMG so that the combined output is maintained at a desired voltage.

2. The permanent magnet generating system of claim 1, wherein the control circuit includes means for developing a first signal representing the voltage of the combined output, means coupled to the developing means for adding the first signal voltage to a reference signal to derive an error signal and means coupled to the adding means and to the actuator for controlling the position of the actuator at least in part based upon the error signal.

3. The permanent magnet generating system of claim 2, wherein the control circuit further includes means coupled to the actuator for developing a position signal representing the position of the actuator and second means for adding the error signal to the positon signal to generate a position error signal which is connected to the position control means.

4. The permanent magnet generating system of claim 3, wherein the position signal developing means comprises a linear variable differential transducer.

5. The permanent magnet generating system of claim 3, wherein the position signal developing means comprises a linear potentiometer.

6. The permanent magnet generating system of claim 1, wherein the actuator includes a control piston having an actuator rod coupled to the first stator and means responsive to the control circuit for controlling the control piston.

7. The permanent magnet generating system of claim 6, wherein the control circuit generates a control signal and wherein the piston control means comprises a servo valve which controls the delivery of hydraulic fluid to the piston in accordance with the control signal.

8. A permanent magnet generating system driven by a source of motive power, comprising:
   separate first and second permanent magnet generators, or PMG's each having a rotating permanent magnet structure connected by a common shaft to the source of motive power and a stator having a set of polyphase armature windings therein, the respective phases of the sets of stator windings being connected in series and developing a polyphase combined output comprising the vector sum of the individual respective phase outputs, the stator and windings of the first PMG being movable relative to the stator and windings of the second PMG;
   a rectifier receiving the polyphase combined output for converting same to a DC voltage;
   an actuator for moving the stator of the first PMG; and
   a control circuit responsive to the position of the first PMG stator and the DC voltage for controlling the actuator to maintain the DC voltage at a desired level irrespective of changes in prime mover speed.

9. The permanent magnet generating system of claim 8, wherein the control circuit includes means for developing a signal representing the level of the DC voltage and means for comparing the DC voltage signal with a reference signal to derive a voltage error signal, the control circuit developing a control signal for the actuator based on such error signal.

10. The permanent magnet generating system of claim 9, further including means for developing a signal representing the position of the first PMG stator and wherein the control circuit includes means for combining the voltage error signal with the PMG position signal to derive the control signal.

11. A permanent magnet generating system driven by a source of motive power to develop alternating current power, comprising:
   a constant speed drive coupled to the source of motive power;
   separate first and second permanent magnet generators, or PMG's, each having a rotating permanent magnet structure connected by a common shaft to the constant speed drive and a stator having a set of armature windings therein, the armature windings of the PMG's being connected together in series and developing a combined output comprising the vector sum of the voltage developed by the individual armature windings, the stator and windings of the first PMG being movable relative to the stator and windings of the second PMG;

an actuator for moving the stator of the first PMG; and a control circuit responsive to the combined output of the PMG's for controlling the actuator to maintain the output at a desired level irrespective of changes in the magnitude of a load energized by the generating system.

12. The permanent magnet generating system of claim 11, wherein the control circuit includes means for sensing the voltage of the combined output of the PMG's, means for comparing the voltage with a reference to derive an error signal and means for controlling the actuator in accordance with the error voltage.

13. The permanent magnet generating system of claim 12, wherein the control circuit further includes means for sensing the current at the output of the PMG's, means for comparing the sensed current with a reference to derive a current error signal and mean for comparing the current error signal with the voltage error signal wherein the controlling means controls the actuator in accordance with the higher valued of the voltage error and the current error.

* * * * *